United States Patent
Odori

(10) Patent No.: US 12,471,872 B2
(45) Date of Patent: Nov. 18, 2025

(54) RADIOGRAPHIC IMAGING SYSTEM, RADIOGRAPHIC IMAGING APPARATUS, CONTROL APPARATUS, CONTROL METHOD, AND STORAGE MEDIUM

(71) Applicant: CANON KABUSHIKI KAISHA, Tokyo (JP)

(72) Inventor: Junya Odori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 18/157,708

(22) Filed: Jan. 20, 2023

(65) Prior Publication Data

US 2023/0233170 A1 Jul. 27, 2023

(30) Foreign Application Priority Data

Jan. 24, 2022 (JP) .................................. 2022-008837

(51) Int. Cl.
*A61B 6/00* (2024.01)
*A61B 6/46* (2024.01)

(52) U.S. Cl.
CPC .................. *A61B 6/54* (2013.01); *A61B 6/46* (2013.01); *A61B 6/56* (2013.01)

(58) Field of Classification Search
None
See application file for complete search history.

(56) References Cited

U.S. PATENT DOCUMENTS

| | | | |
|---|---|---|---|
| 8,654,926 B2 * | 2/2014 | Ohta | G01T 1/24 378/114 |
| 8,742,354 B2 * | 6/2014 | Shimizukawa | A61B 6/4233 250/363.02 |
| 9,413,995 B2 * | 8/2016 | Ohguri | H04N 23/81 |
| 9,638,814 B2 * | 5/2017 | Iijima | A61B 6/56 |
| 9,757,086 B2 * | 9/2017 | Tezuka | A61B 6/56 |
| 10,368,826 B2 * | 8/2019 | Tamura | H05G 1/38 |
| 10,849,577 B2 * | 12/2020 | Okumura | A61B 6/486 |
| 10,856,830 B2 * | 12/2020 | Tanaka | A61B 6/465 |
| 11,172,898 B2 * | 11/2021 | Fukasawa | G01T 1/17 |
| 11,213,271 B2 * | 1/2022 | Tachikawa | G16H 30/20 |
| 11,399,796 B2 * | 8/2022 | Umekawa | A61B 6/52 |
| 12,279,905 B2 * | 4/2025 | Shimizu | A61B 6/548 |

(Continued)

FOREIGN PATENT DOCUMENTS

JP 2011120885 A 6/2011
JP 5708645 B2 * 4/2015 ............. A61B 6/563

*Primary Examiner* — David P Porta
*Assistant Examiner* — Djura Malevic
(74) *Attorney, Agent, or Firm* — Canon U.S.A., Inc. IP Division

(57) ABSTRACT

A radiographic imaging system includes a radiographic imaging apparatus, a control apparatus that controls radiographic imaging, and a notification unit. The radiographic imaging apparatus performs a first wireless communication with the control apparatus to transmit and receive images and a second wireless communication with the control apparatus to transmit and receive radio information to be used for the first wireless communication. The control apparatus causes the notification unit to provide different notifications such as the current state of the radiographic imaging apparatus or a state of a specific processing performed by the radiographic imaging apparatus.

17 Claims, 6 Drawing Sheets

(56) References Cited

U.S. PATENT DOCUMENTS

| | | | | |
|---|---|---|---|---|
| 2011/0280374 A1* | 11/2011 | Ohta | ............ | G01T 1/246 |
| | | | | 378/114 |
| 2012/0018640 A1* | 1/2012 | Shimizukawa | ...... | A61B 6/4464 |
| | | | | 250/354.1 |
| 2012/0018641 A1* | 1/2012 | Watanabe | ............ | A61B 6/4233 |
| | | | | 250/354.1 |
| 2013/0279661 A1* | 10/2013 | Tamura | ............ | A61B 6/42 |
| | | | | 378/114 |
| 2014/0252243 A1* | 9/2014 | Ohguri | ............ | H04N 25/30 |
| | | | | 250/394 |
| 2014/0254759 A1* | 9/2014 | Haraguchi | ............ | G01N 23/04 |
| | | | | 378/62 |
| 2014/0295767 A1* | 10/2014 | Iijima | ............ | A61B 6/56 |
| | | | | 455/41.3 |
| 2015/0117607 A1* | 4/2015 | Hayashi | ............ | A61B 6/463 |
| | | | | 715/767 |
| 2022/0167941 A1* | 6/2022 | Shimizu | ............ | A61B 6/548 |
| 2022/0409164 A1* | 12/2022 | Kosuge | ............ | H04B 17/318 |
| 2023/0233170 A1* | 7/2023 | Odori | ............ | A61B 6/54 |
| | | | | 250/393 |
| 2023/0301615 A1* | 9/2023 | Kobayashi | ............ | A61B 6/566 |
| 2023/0414190 A1* | 12/2023 | Odori | ............ | A61B 6/548 |
| 2024/0243817 A1* | 7/2024 | Morita | ............ | A61B 6/00 |
| 2024/0315658 A1* | 9/2024 | Morita | ............ | A61B 6/563 |
| 2025/0044464 A1* | 2/2025 | Ishinari | ............ | A61B 6/00 |

\* cited by examiner

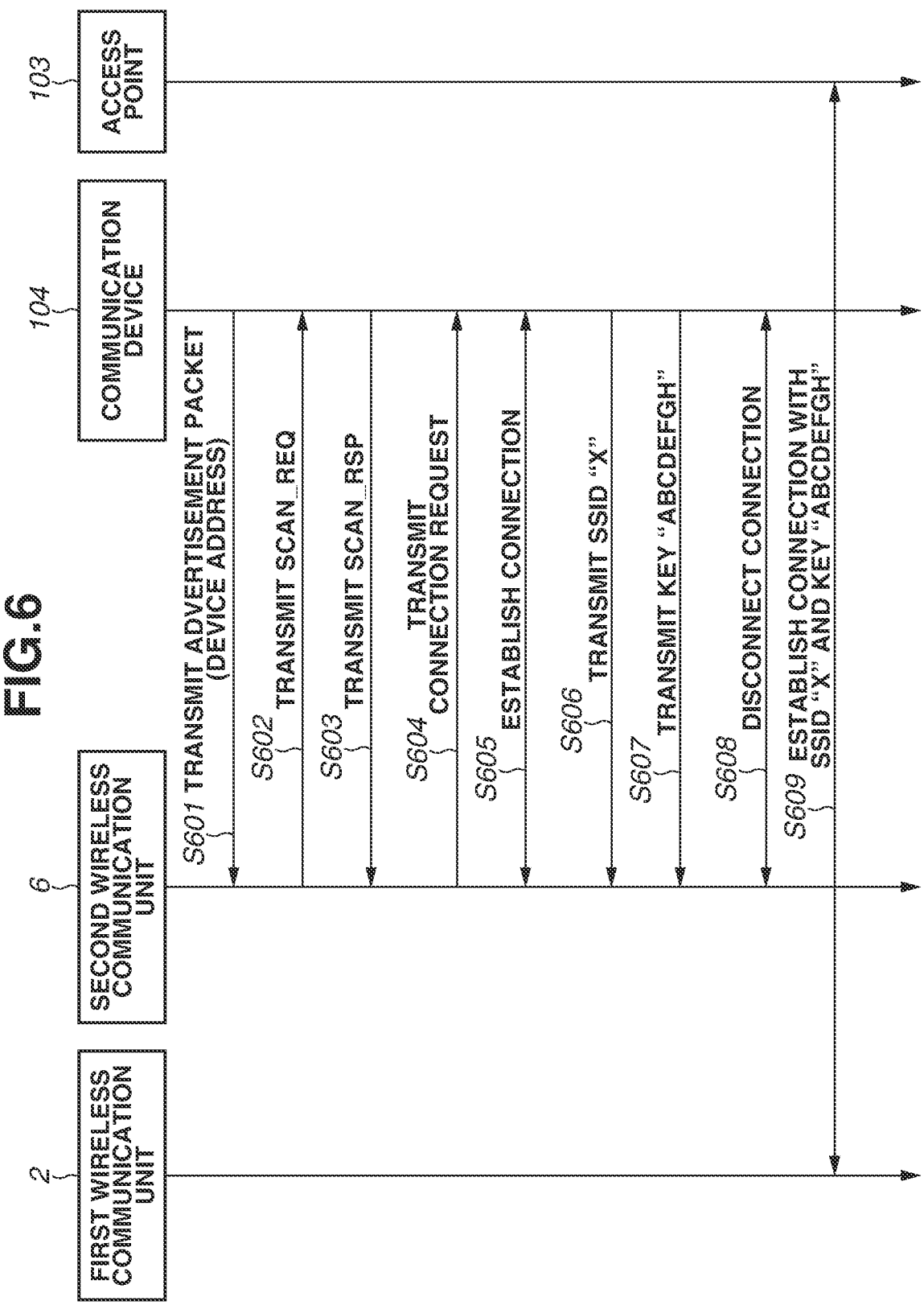

RADIOGRAPHIC IMAGING SYSTEM, RADIOGRAPHIC IMAGING APPARATUS, CONTROL APPARATUS, CONTROL METHOD, AND STORAGE MEDIUM

BACKGROUND

Field

The present disclosure relates to a radiographic imaging system, a radiographic imaging apparatus, a control apparatus, a control method, and a storage medium.

Description of the Related Art

Radiographic imaging systems using radiation are known in the field of medicine. The digitization of the radiographic imaging systems has achieved the widespread use of systems in which radiation is emitted from a radiation generation apparatus to a radiographic imaging apparatus through a subject, the radiographic imaging apparatus generates a digital radiographic image, and an imaging control apparatus enables the image to be checked immediately after radiographic imaging. This leads to an improved workflow compared to conventional imaging methods using films, and enables imaging in a shorter cycle.

In such a radiographic imaging system, there are disclosed a radiographic imaging apparatus and an imaging control apparatus that are wirelessly connected to each other to eliminate the installation limitation of the radiographic imaging apparatus due to a need for cables. To establish the wireless connection between the radiographic imaging apparatus and the imaging control apparatus, the radiographic imaging apparatus and the imaging control apparatus to be connected need to have the same settings for a service set identifier (SSID), an authentication method, an encryption type, and an encryption key, and the like. Normally, these settings are manually set in both of the apparatuses to be connected wirelessly, or the settings are made using a push button method or a personal identification number (PIN) code method defined by Wi-Fi® Protected Setup (WPS).

However, in a case where the settings are manually made, an input operation is necessary and there is also a possibility that the connection can fail to be established due to an operation error. Similarly, in the PIN code method, an operation of inputting a PIN code to a master unit is necessary. In the push button method, it is necessary to perform an operation different from that in a normal workflow of the radiographic imaging system, such as an operation of simultaneously pressing or touching a push button of a slave unit and a push button of a master unit.

Japanese Patent Application Laid-Open No. 2011-120885 discusses a method of setting a wireless connection between a radiographic imaging apparatus and an imaging control apparatus via a connection unit using near-field wireless communication such as infrared communication or Bluetooth® communication having a smaller communication range than the wireless communication range. This eliminates the need for an operator to manually set the wireless connection.

Japanese Patent Application Laid-Open No. 2011-120885 is not seen to discuss notifying an operator of the processing progress when the wireless connection is set via the connection unit using near-field wireless communication. Thus, the operator needs to bring the radiographic imaging apparatus close to the imaging control apparatus and wait until a series of processing is completed, which can result in an increase in waiting time for the operator.

SUMMARY

According to an aspect of the present disclosure, a radiographic imaging system includes a radiographic imaging apparatus configured to perform radiographic imaging based on radiation emitted from a radiation generation apparatus, a control apparatus configured to control the radiographic imaging, the control apparatus including an access point and a communication device each configured to perform wireless communication with the radiographic imaging apparatus, and a notification unit configured to provide a notification to an operator. The radiographic imaging apparatus includes a first wireless communication unit configured to perform a first wireless communication with the access point to transmit image data obtained by the radiographic imaging to the control apparatus and a second wireless communication unit configured to perform a second wireless communication with the communication device to transmit and receive radio information to be used for the first wireless communication. The control apparatus causes the notification unit to provide a first notification based on predetermined processing executed by the control apparatus in a period after start of the second wireless communication and before completion of the transmission and reception of the radio information, and causes the notification unit to provide a second notification based on the completion of the transmission and reception of the radio information in the second wireless communication.

Further features will become apparent from the following description of exemplary embodiments with reference to the attached drawings.

BRIEF DESCRIPTION OF THE DRAWINGS

FIG. 6 is a sequence diagram illustrating an operation performed by the radiographic imaging system according to the first exemplary embodiment in a case where the radiographic imaging apparatus acts as an observer.

DESCRIPTION OF THE EMBODIMENTS

Figure 1:
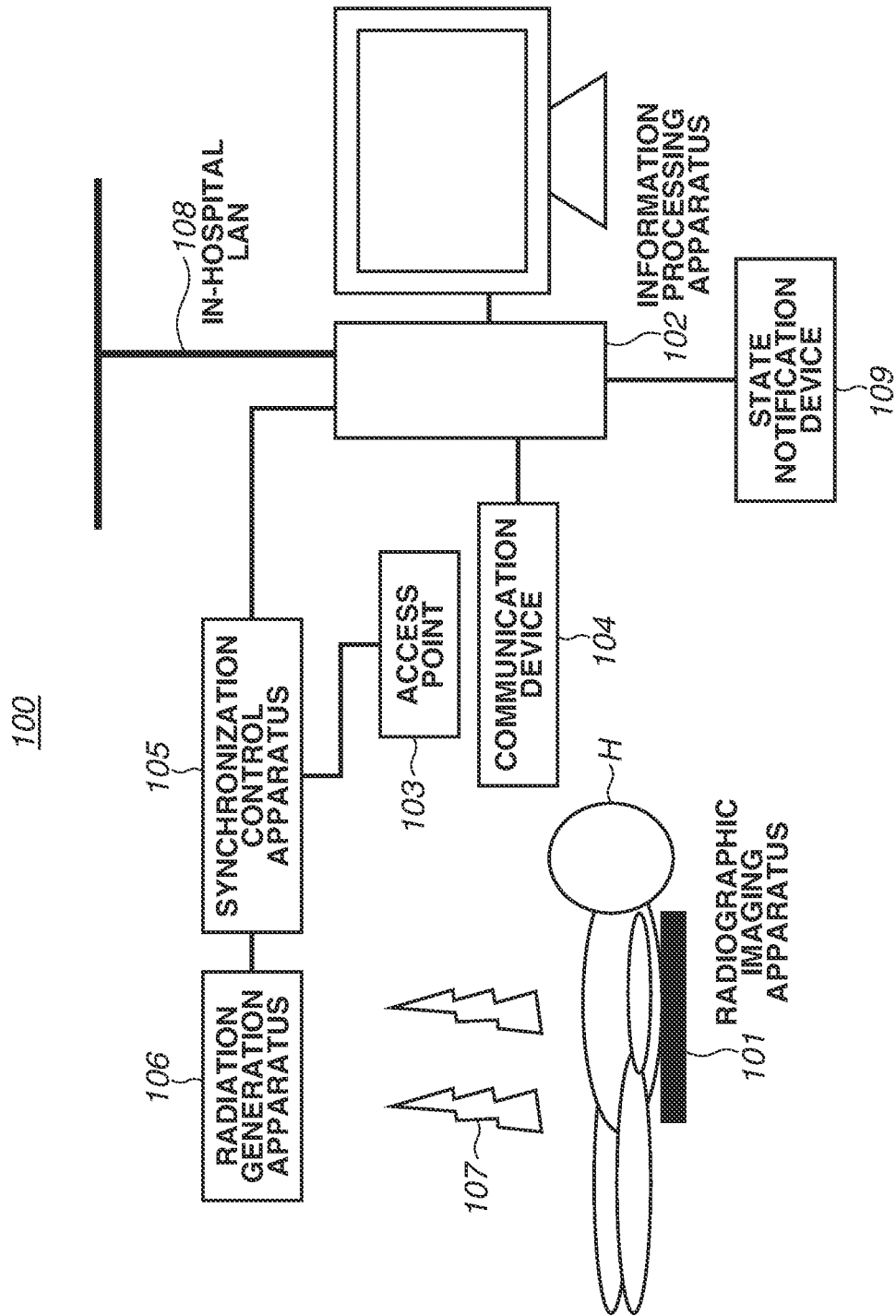
FIG. 1 is a diagram illustrating a configuration example of a radiographic imaging system according to a first exemplary embodiment.

A first exemplary embodiment will be described in detail below with reference to FIGS. 1 to 6. A configuration example of a radiographic imaging system 100 according to the present exemplary embodiment will be described with reference to a schematic diagram illustrated in FIG. 1.

The radiographic imaging system 100 includes a radiographic imaging apparatus 101, an information processing apparatus 102, an access point 103, a communication device 104, a synchronization control apparatus 105, and a radiation generation apparatus 106.

The radiographic imaging apparatus 101 captures a radiographic image based on radiation 107 transmitted through a subject H. As the radiographic imaging apparatus 101, for example, a portable radiographic imaging apparatus can be used. The radiographic imaging apparatus 101 includes, for example, a fluorescent body that converts the radiation 107 into light, and a pixel array in which a plurality of pixels 200 (see FIG. 2) that converts the light into electric charge is two-dimensionally arranged. The radiographic imaging apparatus 101 converts the incident radiation (the radiation 107) into electric charge. The electric charge is processed into image data and is transmitted to the information processing apparatus 102.

The information processing apparatus 102 is a control apparatus implemented by a known technique such as a general-purpose computer, and includes a display unit, an input unit, and a control unit (not illustrated). The information processing apparatus 102 performs image processing on the image data received from the radiographic imaging apparatus 101 for the purpose of correction, storage, and display. Alternatively, the radiographic imaging apparatus 101 can perform some or all of the image processing functions.

The information processing apparatus 102 displays a radiographic image or issues an imaging instruction to an operator via the display unit. The information processing apparatus 102 also has a function enabling the operator to input an imaging condition instruction and the like via the input unit. The control unit of the information processing apparatus 102 has functions of comparing an acquired signal strength with a threshold, returning a response to a connection request, and transmitting information, such as radio information to be described below, for performing communication using a wireless communication unit.

The access point 103 is a device that relays radio waves to wirelessly exchange information between the radiographic imaging apparatus 101 and the information processing apparatus 102. While FIG. 1 illustrates an example where the access point 103 is connected to the information processing apparatus 102 via the synchronization control apparatus 105, the access point 103 can be directly connected to the information processing apparatus 102.

The communication device 104 is connected to the information processing apparatus 102, and transmits and receives radio waves to wirelessly perform near-field communication between the radiographic imaging apparatus 101 and the information processing apparatus 102. For example, the communication device 104 can be a dongle that is connected to the information processing apparatus 102 via a universal serial bus (USB) interface. The communication device 104 is compliant with one or more of the Bluetooth® Basic Rate/Enhanced Data Rate (BR/EDR) standard or the Bluetooth® Low Energy standard.

The communication device 104 can be a radio frequency identifier (RFID) device that exchanges information from a tag containing ID information via near-field wireless communication using an electromagnetic field, radio waves, or the like. Any RFID communication method such as an electromagnetic induction method or a radio-wave method can be used. The communication device 104 can also function as an access point.

While an example where the communication device 104 is connected to the information processing apparatus 102 is described above with reference to FIG. 1, the present exemplary embodiment is not limited to this example. The communication device 104 can be connected to another apparatus, such as the radiation generation apparatus 106, included in the radiographic imaging system 100. The communication device 104 can be replaced by another device incorporated in the radiographic imaging system 100.

A state notification device 109 is connected to the information processing apparatus 102 and serves as a notification unit that provides a notification to the operator. The state notification device 109 provides the operator with a notification about the current state of the radiographic imaging apparatus 101 or a notification that specific processing is completed, based on information about the radiographic imaging apparatus 101 that is received from the radiographic imaging apparatus 101 via the access point 103.

The state notification device 109 uses, for example, a luminous body such as a light-emitting diode (LED) and provides a notification to the operator by preliminarily associating the current state of the radiographic imaging apparatus 101 with a plurality of lighting patterns. Alternatively, the state notification device 109 can use a sound source such as a speaker. In the present case, the state notification device 109 provides a notification to the operator by preliminarily associating the current state of the radiographic imaging apparatus 101 with buzzer sound patterns. These configurations can be used in combination.

While an example where the state notification device 109 is connected to the information processing apparatus 102 is described above, the state notification device 109 can be replaced by another device, such as a display or a speaker, included in the information processing apparatus 102.

The synchronization control apparatus 105 includes a circuit that mediates communication, and monitors the states of the radiographic imaging apparatus 101 and the radiation generation apparatus 106. For example, the synchronization control apparatus 105 controls the emission of the radiation 107 from the radiation generation apparatus 106, and controls the imaging of the subject H by the radiographic imaging apparatus 101. The synchronization control apparatus 105 can incorporate therein a hub or the like for connecting a plurality of network devices.

The radiation generation apparatus 106 includes, for example, a radiation tube (not illustrated) that accelerates electrons at a high voltage and causes the electrons to collide with an anode to generate the radiation 107 such as an X-ray. An X-ray is typically used as the radiation 107, but an α-ray, a β-ray, a γ-ray, or a neutron beam can be used instead.

An in-hospital local area network (LAN) 108 is a LAN constructed in a hospital, and has a function of transmitting and receiving radiographic images captured by the radiographic imaging system 100 to and from sections in the hospital.

In the radiographic imaging system 100 illustrated in FIG. 1, the radiation 107 emitted from the radiation generation apparatus 106 is applied to the subject H such as a patient. The radiographic imaging apparatus 101 generates a radiographic image based on the radiation 107 that has transmitted through the subject H.

The radiographic imaging system 100 is configured to perform imaging using the following imaging methods: synchronous imaging and asynchronous imaging. The synchronous imaging is an imaging method where a radiation emission timing and an imaging timing are synchronized with each other by exchanging electrical synchronization signals between the radiographic imaging apparatus 101 and the radiation generation apparatus 106 via the synchronization control apparatus 105.

The asynchronous imaging is an imaging method where the radiographic imaging apparatus 101 starts imaging upon detecting the incidence of the radiation 107 without exchanging electrical synchronization signals between the radiographic imaging apparatus 101 and the radiation generation apparatus 106. In the asynchronous imaging, the radiographic imaging apparatus 101 can transfer a captured radiographic image every time imaging is performed, or can store a captured radiographic image therein without transferring the image every time imaging is performed.

The radiographic imaging system 100 is configured to perform imaging under imaging conditions generally used for radiographic imaging such as fluoroscopic radiographic imaging, continuous imaging, still image capturing, digital subtraction angiography (DSA) imaging, roadmap imaging, program imaging, tomographic imaging, or tomosynthesis imaging.

In the radiographic imaging system 100, various functional settings for an imaging frame rate, a tube voltage, a tube current, a sensor readout area, a sensor driving binning setting, a collimator diaphragm setting, a radiation window width, and a setting of whether to accumulate captured radiographic images in the radiographic imaging apparatus 101 are made. In addition, functional settings for auto dose control (ADC), auto exposure control (AEC), and the like can be made in the radiographic imaging system 100.

Figure 2:
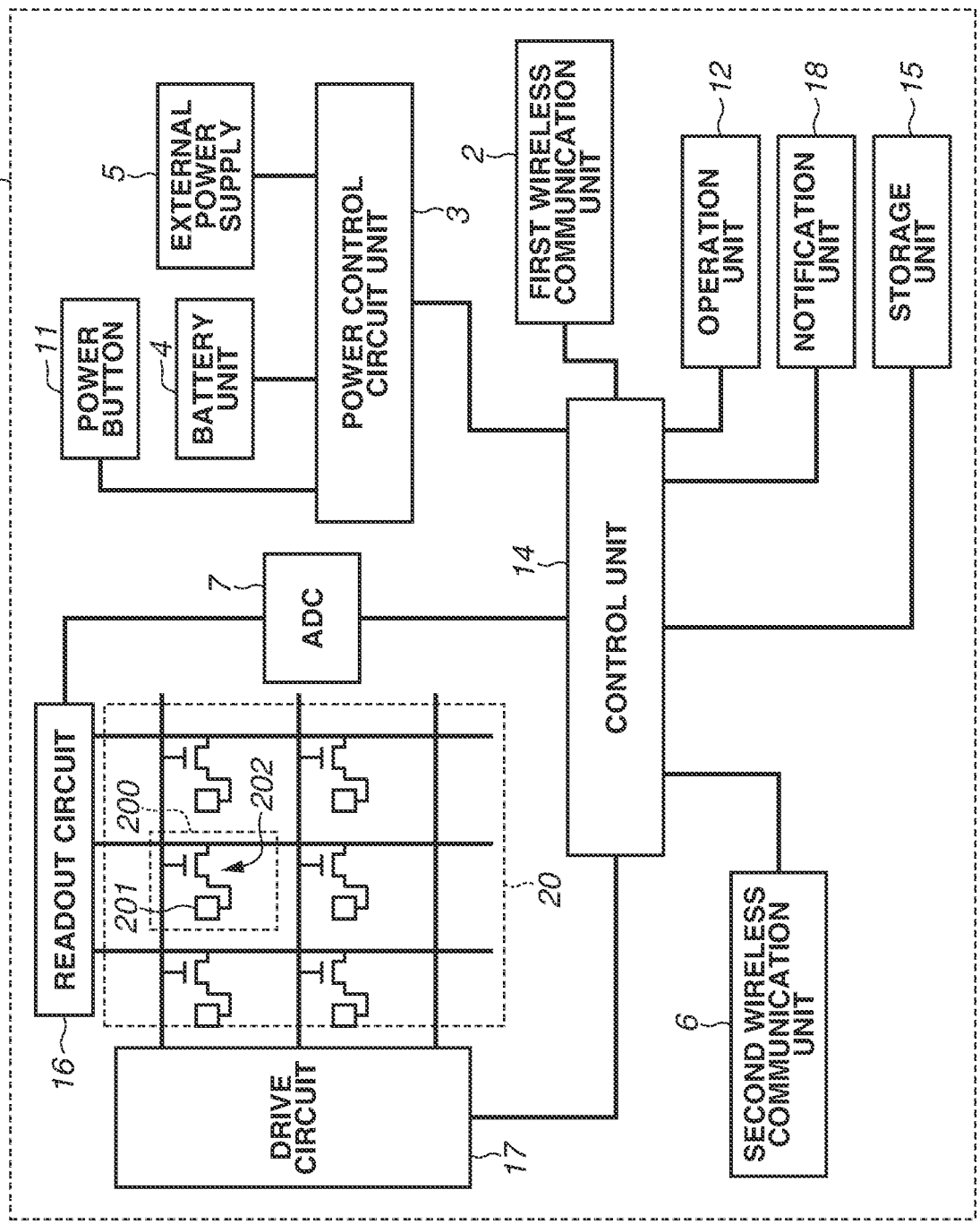
FIG. 2 is a block diagram illustrating a configuration example of a radiographic imaging apparatus according to the first exemplary embodiment.

Next, a configuration example of the radiographic imaging apparatus 101 will be described with reference to FIG. 2. A power button 11 is an operation unit that transmits an instruction to start or stop power supply to each component of the radiographic imaging apparatus 101. The operation unit includes a device and a circuit having this function, and a circuit and others described by a program. A user operates the power button 11 to prepare for imaging. The power button 11 is provided on, for example, a side surface of the radiographic imaging apparatus 101. Alternatively, the power button 11 can be provided on any surface of the radiographic imaging apparatus 101 other than a radiation incident surface.

A battery unit 4 supplies a predetermined voltage to each component of the radiographic imaging apparatus 101. For example, a lithium ion battery or an electric double layer capacitor is used as the battery unit 4. If power is constantly supplied to the radiographic imaging apparatus 101 from an external power supply 5, the battery unit 4 can be omitted.

The external power supply 5 supplies a predetermined voltage to each component of the radiographic imaging apparatus 101 from external to the radiographic imaging apparatus 101. A power feeding method using a wire or a non-contact power feeding method can be used.

A notification unit 18 provides the operator with a notification about the current state of the radiographic imaging apparatus 101 or a notification that specific processing is completed. For example, the notification unit 18 can have a light-emitting function such as patterns of lighting using an LED, and a sound producing function such as a speaker. In the present case, the notification unit 18 preliminarily associates the current state of the radiographic imaging apparatus 101 with any combination of these functions to provide a notification to the operator. The notification unit 18 can have one or both of the light-emitting function and the sound producing function. The light-emitting function can include a plurality of LEDs of different colors. The notification unit 18 can also have a display function of displaying values or images such as a 7-segment LED or a liquid crystal screen.

A power control circuit unit 3 controls power supply to each component of the radiographic imaging apparatus 101 from the battery unit 4 or the external power supply 5 depending on the operation status of the power button 11, and monitors the remaining battery level of the battery unit 4. For example, the power control circuit unit 3 transforms the voltage from the battery unit 4 or the external power supply 5 into a predetermined voltage, and supplies the predetermined voltage to each component of the radiographic imaging apparatus 101. For example, if the external power supply 5 is not connected to the radiographic imaging apparatus 101, the power control circuit unit 3 switches on or off the power supply from the battery unit 4 depending on the operation of the power button 11.

A radiation detection unit 20 detects the radiation 107 transmitted through the subject H as image signals (electric charge). The radiation 107 transmitted through the subject H is incident on the fluorescence body included in the radiation detection unit 20, and is converted into light by the fluorescence body. This light is converted into image signals (electric charge) by photoelectric conversion elements 201 in the plurality of pixels 200 arranged in a two-dimensional array. The image signals (electric charge) are read out by a readout circuit 16 and a drive circuit 17.

If the pixels 200 in a certain row are selected by a drive signal generated by the drive circuit 17, switching elements 202 in the pixels 200 in the certain row are sequentially turned on. The image signals (electric charge) accumulated in the photoelectric conversion elements 201 in the pixels 200 in the certain row are respectively output to signal lines connected to the pixels 200. The readout circuit 16 has a function of amplifying the image signals (electric charge) output to the signal lines, and sequentially reads out the image signals from the radiation detection unit 20.

An analog-to-digital converter (ADC) 7 converts the analog image signals read out from the readout circuit 16 into digital image signals, and outputs the digital image signals as a radiographic image to a control unit 14. In other words, the ADC 7 serves as an analog-to-digital (A/D) conversion unit that converts the analog image signals read out from the readout circuit 16 into digital data.

A storage unit 15 stores the radiographic image data output from the ADC 7, a system identifier, a threshold for signal strength between the radiographic imaging apparatus 101 and the communication device 104, and an offset image. The storage unit 15 can also store an engineer ID as engineer identification information corresponding to generated image data, a patient ID as patient identification information, imaging conditions, including an imaging time, an imaging dose, an imaging area, and the number of captured images, and a radiographic image data transfer history.

The storage unit 15 is a readable and writable device. More specifically, a non-volatile memory such as a flash memory is used as the storage unit 15. However, the storage unit 15 is not limited thereto, and can be a volatile storage device such as a synchronous dynamic random access memory (SDRAM). Alternatively, a detachable device such as a secure digital (SD) card can be used, and the detachable device can be attached to the information processing apparatus 102.

A first wireless communication unit 2 is used as a communication unit that communicates with the access point 103 via a wireless LAN and transmits and receives data such as radiographic images to and from the information processing apparatus 102. The first wireless communication unit 2 is also used as a communication unit when the radiographic imaging by the radiographic imaging apparatus 101 is controlled from the information processing apparatus 102. A wireless communication module is set in the first wireless communication unit 2 depending on media to be used for communication with the information processing apparatus 102, the synchronization control apparatus 105, and the like. Radio transmission power can be set in the first wireless communication unit 2 by the control unit 14.

The first wireless communication unit 2 stores information about a data rate, packet loss per unit time, round trip time (RTT), packet buffer occupancy, and the like. The first wireless communication unit 2 also stores information about a received signal strength indicator (RSSI) indicating received signal strength and a signal-to-noise ratio (SNR) in wireless communication.

A second wireless communication unit 6 communicates with the communication device 104 via a wireless personal area network (PAN). As the second wireless communication unit 6, a device compliant with one or more of the Bluetooth® BR/EDR standard or the Bluetooth® Low Energy standard is used depending on the communication device 104 with which the second wireless communication unit 6 communicates.

The second wireless communication unit 6 is configured to communicate with the communication device 104 to transmit and receive radio information to be used for performing wireless communication between the radiographic imaging apparatus 101 and the information processing apparatus 102 using the first wireless communication unit 2. The term "radio information" used herein refers to an identifier for the radiographic imaging system 100, an SSID and an encryption key to be used for communication with the first wireless communication unit 2, and the like. Radio transmission power can be set in the second wireless communication unit 6 by the control unit 14.

As the second wireless communication unit 6, a wireless communication module is used based on media to be used for communication with the communication device 104 of the information processing apparatus 102. For example, if the communication device 104 is a wireless communication module compliant with the Bluetooth® Low Energy standard, a wireless communication module compliant with the Bluetooth® Low Energy standard is also used as the second wireless communication unit 6.

The second wireless communication unit 6 stores information about a data rate, packet loss per unit time, RTT, packet buffer occupancy, and the like. The second wireless communication unit 6 can also store information about the RSSI and S/N ratio for signals in wireless communication.

An operation unit 12 can be used as a manual trigger for exchanging radio information between the radiographic imaging apparatus 101 and the communication device 104. For example, operating the operation unit 12 can enable the transmission and reception of the identifier for the radiographic imaging system 100 and the SSID and encryption key to be set in the first wireless communication unit 2. The operation unit 12 is provided on, for example, the side surface of the radiographic imaging apparatus 101. Alternatively, the operation unit 12 can be provided on any surface of the radiographic imaging apparatus 101 other than the radiation incident surface.

The control unit 14 enables or disables permission to communicate with an external device such as the communication device 104, and also controls communication with the external device. In a case where the second wireless communication unit 6 performs wireless communication, the control unit 14 transmits a packet from the second wireless communication unit 6 based on the signal strength set for the communication device 104. At this time, the radiographic imaging apparatus 101 can use the notification unit 18 to provide the operator with a notification that the packet transmission is started.

Meanwhile, the information processing apparatus 102 determines whether to start a connection via the communication device 104, based on the signal strength of the received packet and a threshold for signal strength pre-stored in the information processing apparatus 102.

For example, the radiographic imaging apparatus 101 broadcasts an advertisement packet including the identifier indicating the radiographic imaging apparatus 101. The information processing apparatus 102 determines whether the identifier included in the advertisement packet received via the communication device 104 matches a pre-stored identifier. The information processing apparatus 102 acquires the signal strength of the received advertisement packet. If the signal strength exceeds the threshold for signal strength pre-stored in the information processing apparatus 102, the information processing apparatus 102 starts the connection via the communication device 104.

In the present case, the signal strength of the packet received by the communication device 104 decreases as the distance from the second wireless communication unit 6 to the communication device 104 increases. Thus, using the signal strength as a threshold enables starting the connection only in a case where the second wireless communication unit 6 and the communication device 104 are in proximity to each other at a distance less than a certain distance.

As the value of the signal strength of the received advertisement packet, the result of data processing, such as averaging a plurality of acquired values or using a value obtained by moving average, can be used and compared with the threshold. Alternatively, an algorithm to start the connection when a predetermined number of advertisement packets each having a signal strength exceeding the threshold are received can be used. Any combination of data processing and algorithms can be applied.

The communication device 104 sets a condition where the signal strength of the received packet exceeds the threshold as a determination condition for processing for transmitting a connection request from the communication device 104. It is thus desirable for the operator to bring the second wireless communication unit 6 of the radiographic imaging apparatus 101 and the communication device 104 of the information processing apparatus 102 in proximity to each other at a distance less than a certain distance to make the signal strength exceed the threshold until the connection is established.

Upon detecting establishment of the connection between the second wireless communication unit 6 and the communication device 104, the information processing apparatus 102 provides a first notification to the operator using the state notification device 109. After establishment of the connection, the operator can freely move the radiographic imaging apparatus 101 within the communication environment distance defined in the Bluetooth® BR/EDR standard or the Bluetooth® Low Energy standard. Thus, the operator, having received the first notification, can move the radiographic imaging apparatus 101 from the vicinity of the communication device 104, and can shift to the next operation without waiting for completion of transmission and reception of communication settings for the first wireless communication unit 2 as described below.

After the connection is started, the control unit 14 communicates the system identifier, the communication settings (the SSID and the encryption key) for the first wireless communication unit 2, and the like. Once the transmission and reception of all settings has been successfully completed, or once the communication has failed due to the occurrence of an abnormality during the transmission and reception, the information processing apparatus 102 provides a second notification to the operator using the state notification device 109. In the present case, it is desirable to set notification patterns for the state notification device 109 so that the operator can easily distinguish between the successful communication and the failed communication.

As a method for providing the first notification and the second notification using the state notification device 109, it is desirable to use different operation patterns so that the operator can easily distinguish between the first notification and the second notification. For example, the use of different notification operation patterns for at least one of the type of the sound to be produced and the light-emission pattern or color of the LED enables the operator to easily distinguish between the first notification and the second notification.

If there is a difference between the newly set communication settings and the current communication settings, the control unit 14 controls the first wireless communication unit 2 to communicate with the access point 103 using the new communication settings.

In the present case, the new communication settings can be stored in the storage unit 15. During the communication using the new communication settings, the notification unit 18 of the radiographic imaging apparatus 101 can be used to provide a display for the operator. The system identifier can be information in an advertisement packet or a response (SCAN_RSP) packet in response to an active scan request (SCAN_REQ), which is transmitted before the connection.

An operation performed by the radiographic imaging system 100 before a connection between the first wireless communication unit 2 and the access point 103 is established will now be described with reference to a flowchart of FIG. 3.

In step S301, the radiographic imaging apparatus 101 broadcasts an advertisement packet to transmit information such as the signal strength at predetermined time intervals in order to start communication for exchanging communication setting information. The information processing apparatus 102 receives the broadcasted advertisement packet. An operation on the operation unit 12 or a control operation using software in the information processing apparatus 102 can be used as a trigger for starting the communication.

In the present case the radiographic imaging apparatus 101 may set a lower transmission power for the second wireless communication unit 6. The setting of a lower transmission power prevents the packet from reaching a long distance and limits the packet reception range in which the communication device 104 can receive the broadcasted packet. The processing then proceeds to step S302.

In step S302, the information processing apparatus 102 determines whether the information (the identifier for the radiographic imaging apparatus 101) included in the received advertisement packet matches the pre-stored identifier. If the information included in the received advertisement packet matches the pre-stored identifier (YES in step S302), the information processing apparatus 102 acquires the signal strength from the communication device 104, and then the processing proceeds to step S303.

If the information included in the received advertisement packet does not match the pre-stored identifier (NO in step S302), the processing returns to step S301.

In step S303, the information processing apparatus 102 determines whether the signal strength in the communication between the communication device 104 and the radiographic imaging apparatus 101 exceeds the threshold pre-set in the information processing apparatus 102. If the information processing apparatus 102 determines that the signal strength exceeds the threshold (YES in step S303), the processing proceeds to step S304. If the signal strength does not exceed the threshold (NO in step S303), the processing returns to step S301.

In step S304, the communication device 104 starts a connection to the second wireless communication unit 6. The processing then proceeds to step 305.

In step S305, the information processing apparatus 102 detects whether the connection between the communication device 104 and the second wireless communication unit 6 is established. If the information processing apparatus 102 detects establishment of the connection between the communication device 104 and the second wireless communication unit 6 (YES in step S305), the processing proceeds to step S306. If the connection is not established (NO in step S305), the processing returns to step S304.

In step S306, the information processing apparatus 102 causes the state notification device 109 to provide the first notification to the operator. The radiographic imaging apparatus 101 can increase the transmission power for the second wireless communication unit 6 once the connection between the communication device 104 and the second wireless communication unit 6 has been established. Large signal strength after establishment of the connection enables the communication device 104 to receive a high quality packet with a high S/N ratio, enabling the communication device 104 to stably transmit and receive parameters such as the communication settings.

In step S307, the communication device 104 starts data communication using the Generic Attribute Profile (GATT) that defines methods for structuring data and exchanging data between applications. For example, the second wireless communication unit 6 is set to act as a client and the communication device 104 is set to act as a server. The processing then proceeds to step S308.

In step S308, the communication device 104 communicates the communication settings (the SSID and the encryption key) according to an appropriate protocol (e.g., a protocol enabling information to be received in agreed-upon order), and determines whether the communication is completed. If the communication is completed (YES in step S308), the processing proceeds to step S309. If the communication fails (NO in step S308), the processing returns to step S307.

A Universally Unique Identifier (UUID) for uniquely identifying the GATT service can be predefined between the radiographic imaging apparatus 101 and the information processing apparatus 102, or can be negotiated during communication.

With respect to the communication settings, settings for a wireless channel, an Internet Protocol (IP) address of the radiographic imaging apparatus 101, master and slave units, an encryption method, an IP address of the synchronization control apparatus 105 can be made as needed.

In another exemplary embodiment, the communication device 104 can communicate the system identifier in step S308 instead of communicating the system identifier in step S302.

In step S309, upon completion of the communication, the state notification device 109 provides the second notification to the operator. The processing then proceeds to step S310.

In step S310, the communication device 104 determines whether there is a difference between the newly set communication settings and the current communication settings. If there is a difference between the new communication settings and the current communication settings (YES in step S310), the processing proceeds to step S311. If there is no difference between the new communication settings and the current communication settings (NO in step S310), the processing in the flowchart is terminated.

In step S311, the communication device 104 controls the first wireless communication unit 2 or the second wireless communication unit 6 to perform communication using the new communication settings made in the previous steps. The processing then proceeds to step S312.

In step S312, the communication device 104 stores the new communication settings in the information processing apparatus 102, and then the processing in the flowchart ends.

Figure 4:
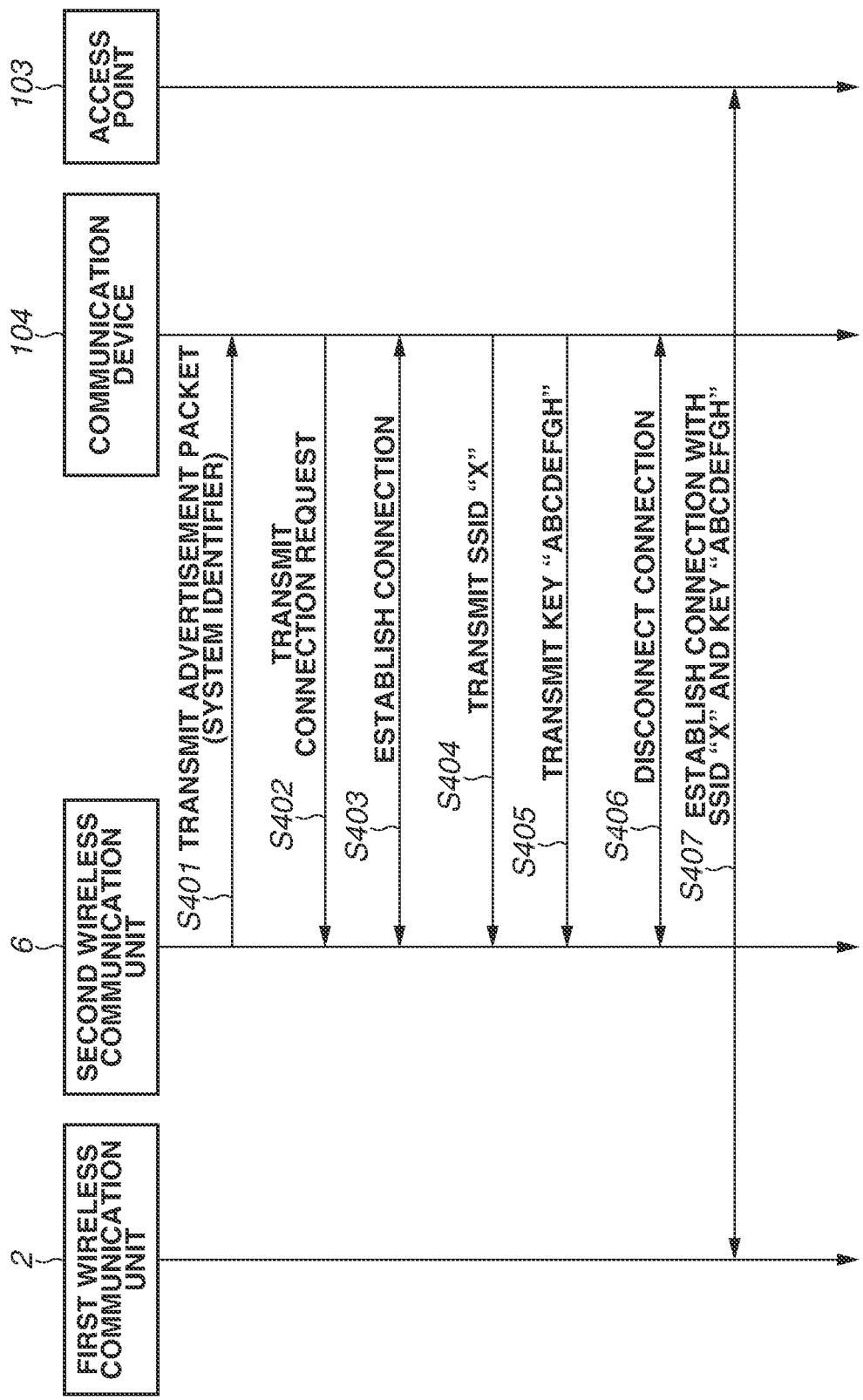
FIG. 4 is a sequence diagram illustrating the operation performed by the radiographic imaging system according to the first exemplary embodiment.

An operation performed by the radiographic imaging system 100 before the connection between the first wireless communication unit 2 and the access point 103 is established will now be described with reference to a sequence diagram illustrated in FIG. 4. FIG. 4 illustrates an operation example in which the radiographic imaging apparatus 101 acts as a broadcaster (an advertiser) that broadcasts data and the information processing apparatus 102 acts as an observer (a scanner) that monitors data.

In step S401, the radiographic imaging apparatus 101 acts as the advertiser that broadcasts an advertisement packet to establish a connection to one of a plurality of the information processing apparatuses 102 after start-up. The radiographic imaging apparatus 101 transmits information including the system identifier to the communication device 104 using the second wireless communication unit 6. A transmission power and a packet transmission cycle in the transmission can be set in advance.

At this time, the notification unit 18 of the radiographic imaging apparatus 101 can display information indicating that the connection to the information processing apparatus 102 is being established. For example, an LED can be used as the notification unit 18 and can blink to indicate that the connection to the information processing apparatus 102 is being established.

The communication device 104 acts as the scanner that is ready to receive the advertisement packet. When the information processing apparatus 102 recognizes the connection partner based on the system identifier received by the communication device 104 from the second wireless communication unit 6, the information processing apparatus 102 makes a determination based on a predetermined threshold for signal strength. If the information processing apparatus 102 determines that the signal strength of the received packet exceeds the threshold, the operation proceeds to step S402. If the information processing apparatus 102 determines that the signal strength does not exceed the threshold, the operation of step S401 is repeated.

When the broadcasting of the advertisement packet is started, a timeout time is set in the control unit 14 of the radiographic imaging apparatus 101. The radiographic imaging apparatus 101 cancels the broadcasting if it is not determined that the identifiers are matched between the second wireless communication unit 6 and the communication device 104 and the signal strength exceeds the threshold in a period after the start of broadcasting of the advertisement packet and before the timeout time elapses.

When the radiographic imaging apparatus 101 cancels the broadcasting due to timeout, information indicating that the broadcasting of the advertisement packet is canceled can be displayed on the notification unit 18 of the radiographic imaging apparatus 101. For example, a display unit thereof can use an LED and display the information indicating the cancellation of the broadcasting of the advertisement packet by changing the LED from a blinking state to an off state or causing the LED to blink in a different cycle.

The user can operate the power button 11 of the radiographic imaging apparatus 101 to cancel establishment of the connection before it is determined that the identifiers are matched between the second wireless communication unit 6 and the communication device 104 and the signal strength exceeds the threshold. Also in the present case, similarly to the case of timeout, information indicating that establishment of the connection is canceled can be displayed by turning off the LED of the notification unit 18 or causing the LED to blink in a different cycle.

In step S402, the communication device 104 transmits a connection request to the second wireless communication unit 6, and then the operation proceeds to step S403. The connection request can be transmitted via an operation by the operator using the input unit of the information processing apparatus 102. When the operation of step S402 is performed, the communication device 104 enters an initiating state that is a connection start state.

When the second wireless communication unit 6 receives the connection request from the communication device 104, a link timeout time is set in the control unit 14. If the connection between the communication device 104 and the second wireless communication unit 6 is not established before the link timeout time elapses, a notification that establishment of the connection has failed is provided from the radiographic imaging apparatus 101 to the information processing apparatus 102.

The information processing apparatus 102, after receiving the notification, cancels establishment of the connection to the radiographic imaging apparatus 101. In the present case, information indicating that establishment of the connection is canceled can be displayed on the notification unit 18 of the radiographic imaging apparatus 101. Also in the present case, similarly to the case of timeout, the information indicating that establishment of the connection is canceled can be displayed by changing the LED from the blinking state to the off state, or causing the LED to blink in a different cycle.

In step S403, the connection between the second wireless communication unit 6 and the communication device 104 is established. At this time, the second wireless communication unit 6 and the communication device 104 can establish a pairing to share an encryption key or can search for each other's services. Then, the operation proceeds to step S404. Upon establishment of the connection between the second wireless communication unit 6 and the communication device 104, the first notification is provided to the operator using the state notification device 109.

In step S404, the communication device 104 transmits the SSID for the access point 103 to the second wireless communication unit 6. For example, the SSID is a character string "X". It is desirable to encrypt the SSID, but the SSID may not necessarily be encrypted. The operation then proceeds to step S405.

In step S405, the communication device 104 transmits the encryption key (Key) for the access point 103 to the second wireless communication unit 6. For example, the "Key" is a character string "ABCDEFGH". It is desirable to encrypt the "Key", but the "Key" may not necessarily be encrypted. Upon completion of the transmission and reception of all settings, the second notification is provided to the operator using the state notification device 109. The operation then proceeds to step S406.

In step S406, the connection between the communication device 104 and the second wireless communication unit 6 is disconnected, and then the operation proceeds to step S407.

In step S407, the control unit 14 of the information processing apparatus 102 controls the first wireless communication unit 2 to be connected to the access point 103 using the communication settings received in steps S404 and S405. The access point 103 performs authentication using the new communication settings and performs communication.

Figure 5:
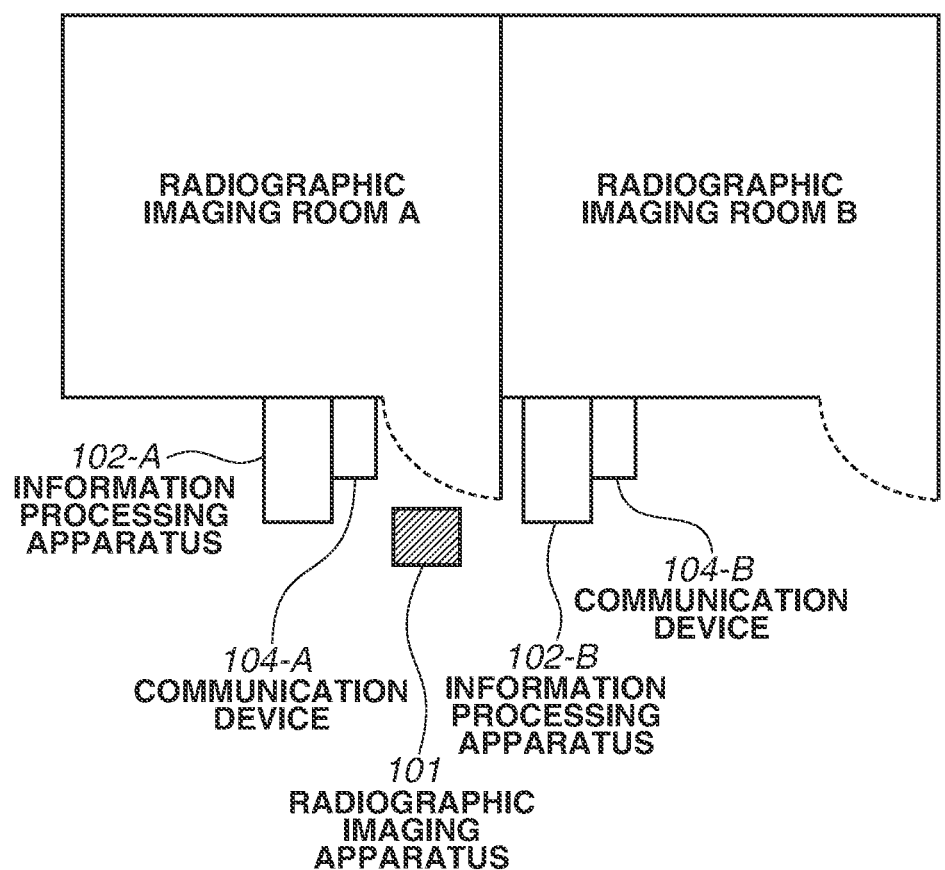
FIG. 5 illustrates a layout example of apparatuses according to the first exemplary embodiment.

A method for connecting the radiographic imaging apparatus 101 and the information processing apparatuses 102 in a case where a plurality of information processing apparatuses 102 is located near the radiographic imaging apparatus 101 will now be described with reference to a layout example of the apparatuses illustrated in FIG. 5. In the example of FIG. 5, the radiographic imaging apparatus 101 acts as the broadcaster (the advertiser) that broadcasts data and the information processing apparatuses 102 each act as the observer (the scanner) that monitors data. In the example of FIG. 5, the information processing apparatuses 102 used in radiographic imaging rooms A and B are distinguished from each other by adding hyphens and characters "A" and "B" after the names, respectively. More specifically, the information processing apparatus 102 used in the radiographic imaging room A is referred to as an information processing apparatus 102-A and the information processing apparatus 102 used in the radiographic imaging room B is referred to as an information processing apparatus 102-B.

A case will now be described where a plurality of the communication devices 104 (104-A and 104-B) is close to the radiographic imaging apparatus 101 as illustrated in FIG. 5 in the delivery of radio information described above with reference to FIGS. 3 and 4. If the radiographic imaging apparatus 101 acts as the advertiser that broadcasts an advertisement packet, the communication devices 104-A and 104-B are both determined to be connection target devices.

In the present case, based on the Bluetooth® BR/EDR standard or the Bluetooth® Low Energy standard, the connection to the communication device 104 that transmitted the connection request earlier is established, and the SSID and Key associated with the corresponding information processing apparatus 102 are set in the radiographic imaging apparatus 101. As a result, the radiographic imaging apparatus 101 could be connected to the unintended information processing apparatus 102.

In the present exemplary embodiment, the state notification device 109 is connected to each of the information processing apparatuses 102, which enables the operator to easily recognize which one of the state notification devices 109 connected to the information processing apparatuses 102 has provided the first notification or the second notification. For example, in a case where the communication device 104-A of the information processing apparatus 102-A to which the operator intends to establish a connection is not operated properly and the operator has erroneously established a connection to the communication device 104-B, the notification is provided from the state notification device 109 in the radiographic imaging room B. This enables the operator to easily recognize the erroneous connection.

Alternatively, the radiographic imaging apparatus 101 can act as the observer (the scanner) that monitors data and the information processing apparatus 102 can act as the broadcaster (the advertiser) that broadcasts data. This example will be described next with reference to a sequence diagram illustrated in FIG. 6. Descriptions of steps similar to those in the sequence diagram illustrated in FIG. 4 will be omitted.

In step S601, the information processing apparatus 102 acts as the advertiser that broadcasts an advertisement packet after start-up, and uses the communication device 104 to transmit information including a device address to the second wireless communication unit 6. In this case, the transmission power and the packet transmission cycle can be set in advance. The second wireless communication unit 6 acts as the scanner that is ready to receive the advertisement packet. If the second wireless communication unit 6 receives the advertisement packet and recognizes the connection partner based on the device address, the operation proceeds to step S602.

In step S602, if the amount of information in the advertisement packet is insufficient, the second wireless communication unit 6 transmits an active scan request (SCAN_REQ), and then the operation proceeds to step S603.

In step S603, upon receiving the SCAN_REQ, the communication device 104 transmits a scan response (SCAN_RSP) packet to the second wireless communication unit 6. The second wireless communication unit 6 receives the SCAN_RSP packet and performs the operation of step S604. At this time, the second wireless communication unit 6 enters the initiating state that is the connection start state.

Steps S604 to S609 are similar to steps S402 to S407, respectively.

As described above, in the present exemplary embodiment, the state notification device 109 connected to the information processing apparatus 102 is used to provide the first notification when the connection between the second wireless communication unit 6 and the communication device 104 is established. Then, when the transmission and reception of all the settings is completed, the state notification device 109 is used to provide the second notification. This enables the operator to easily recognize the connection progress and to simply perform the connection with a shorter waiting time.

A second exemplary embodiment differs from the first exemplary embodiment illustrated in FIG. 4 in that the first notification and the second notification are provided using the notification unit 18 of the radiographic imaging apparatus 101 as the notification unit.

When the connection between the second wireless communication unit 6 and the communication device 104 is established, the notification unit 18 of the radiographic imaging apparatus 101 provides the first notification to the operator. The notification unit 18 can provide the notification by, for example, emitting light or producing a sound, like in the first exemplary embodiment. It may be difficult to expand the functionality of the notification unit 18 due to a limited layout space in the radiographic imaging apparatus 101, and thus the notification unit 18 may include an LED of a single color, a small liquid crystal display (LCD), or the like.

For example, in the case of using an LED, it is desirable to prepare a plurality of lighting patterns such as different cycles of lighting, turning-off, and blinking or different numbers of blinks, and provide the first notification and the second notification to the operator using the respective corresponding lighting patterns. Since there are limitations on the size also in the case of using an LCD, it is desirable to extract minimum information from the information in the case of providing a notification using the state notification device 109 connected to the information processing apparatus 102, and display the information on the LCD, like in the first exemplary embodiment.

If the plurality of information processing apparatuses 102-A and 102-B is present as illustrated in FIG. 5, it is desirable to enable the operator to recognize which one of the information processing apparatuses 102-A and 102-B corresponds to the notification content communicated by the notification unit 18. For example, the information processing apparatuses 102-A and 102-B are distinguished using different notification patterns, such as different notification sounds or LED colors, for different connection targets, thereby enabling the operator to easily recognize the erroneous connection.

While exemplary embodiments have been described above, these exemplary embodiments are not seen to be limiting. Various appropriate modifications can be made.

Figure 3:
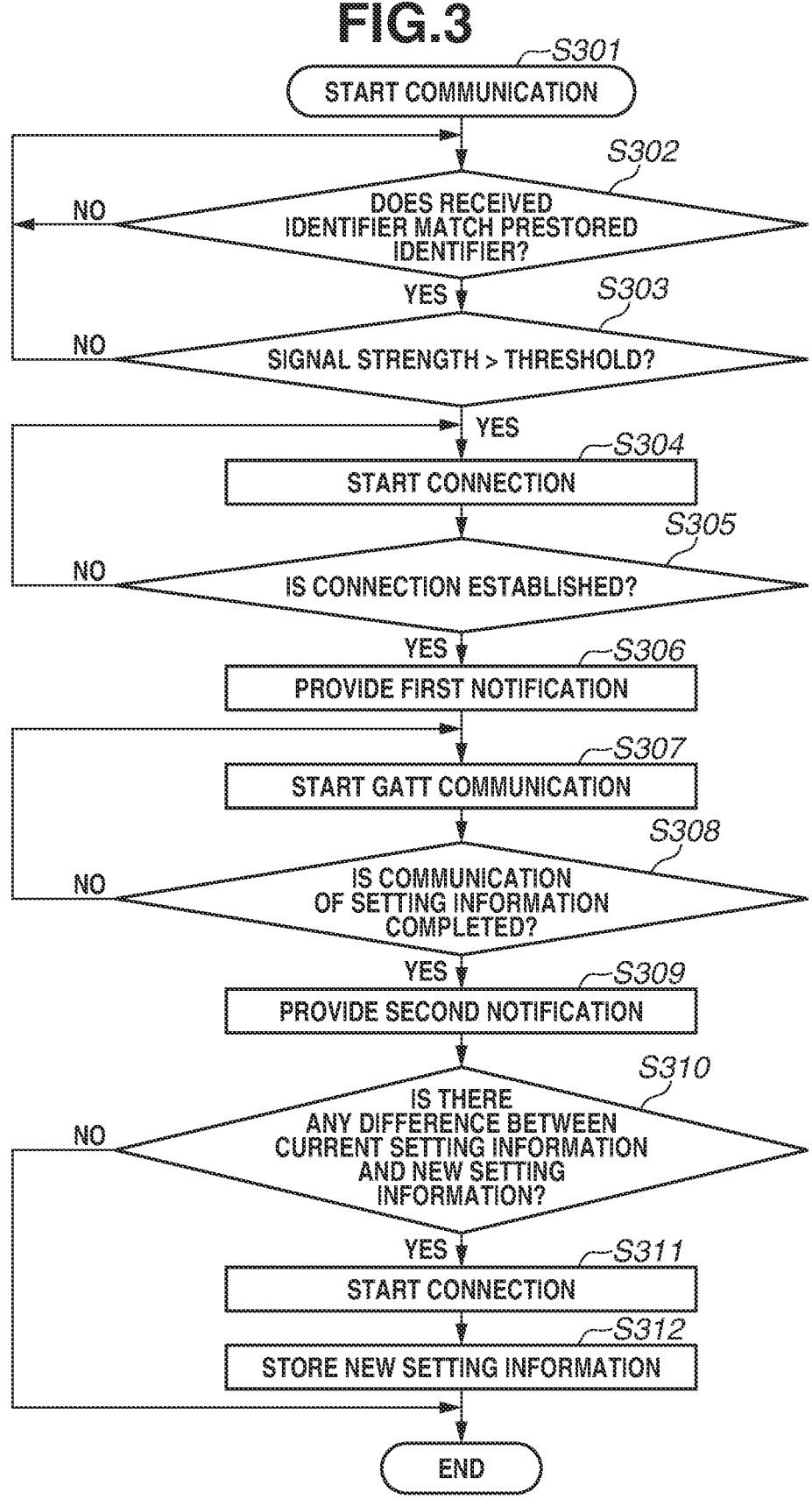
FIG. 3 is a flowchart illustrating an operation performed by the radiographic imaging system according to the first exemplary embodiment.

For example, FIG. 3 illustrates the operation example where the first notification is provided in step S306 in a case where the information processing apparatus 102 detects the establishment of the connection between the communication device 104 and the second wireless communication unit 6. However, the configuration is not limited thereto. The first notification can be provided based on predetermined processing executed in a period after the communication between the communication device 104 and the second wireless communication unit 6 is started and before the establishment of the connection is completed.

For example, the first notification can be provided in step S302, i.e., when the information processing apparatus 102 detects the match between the identifier for the radiographic imaging apparatus 101 received by the information processing apparatus 102 and the identifier pre-stored in the information processing apparatus 102. Alternatively, the first notification can be provided in step S303, i.e., when the information processing apparatus 102 detects the signal strength in the communication between the communication device 104 and the radiographic imaging apparatus 101 as exceeding the threshold.

The above-described exemplary embodiments can also be implemented by the following processing. A program for implementing the above-described functions is supplied to a system or an apparatus via a network or a storage medium, and one or more processors in a computer of the system or the apparatus read out and execute the program.

Various recording media, such as a flexible disk, an optical disk (e.g., a compact disc read-only memory (CD-ROM) or a digital versatile disk (DVD)-ROM), a magneto-optical disk, a magnetic tape, a non-volatile memory (e.g., a USB memory), and a ROM can be used. The program for implementing the above-described functions can be downloaded via a network and executed by a computer.

The functions according to the exemplary embodiments described above can be implemented not only by the processing in which a program code read out by a computer is executed, but also by processing in which an operating system (OS) or the like running on a computer executes a part or all of actual processing based on an instruction from the program code.

A program code read out from a recording medium can be written into a function extension board incorporated in a computer or a memory included in a function extension unit connected to the computer. Based on an instruction from the program code, the above-described functions can be implemented by processing in which a central processing unit (CPU) or the like included in the function extension board or the function extension unit executes a part or all of actual processing.

According to at least one of the above-described exemplary embodiments, it is possible for an operator to easily recognize the progress of a wireless setting operation of connecting an intended wireless device in a radiographic imaging system to a radiographic imaging apparatus, and to simply perform the operation with a shorter waiting time.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiment are not seen to be limiting. The scope of the following claims is to be accorded the broadest interpretation so as to encompass all such modifications and equivalent structures and functions.

This application claims the benefit of Japanese Patent Application No. 2022-008837, filed Jan. 24, 2022, which is hereby incorporated by reference herein in its entirety.

What is claimed is:

1. A radiographic imaging system comprising:
a radiographic imaging apparatus configured to perform radiographic imaging based on radiation emitted from a radiation generation apparatus;
a control apparatus configured to control the radiographic imaging, the control apparatus including an access point and a communication device each configured to perform wireless communication with the radiographic imaging apparatus; and
a notification unit configured to provide a notification to an operator,
wherein the radiographic imaging apparatus includes a first wireless communication unit configured to perform a first wireless communication with the access point to transmit image data obtained by the radiographic imaging to the control apparatus and a second wireless communication unit configured to perform a second wireless communication with the communication device to transmit and receive radio information to be used for the first wireless communication, and
wherein the control apparatus causes the notification unit to provide a first notification based on predetermined processing executed by the control apparatus in a period after start of the second wireless communication and before completion of the transmission and reception of the radio information, and causes the notification unit to provide a second notification based on the completion of the transmission and reception of the radio information in the second wireless communication.

2. The radiographic imaging system according to claim 1, wherein the control apparatus determines whether to start the transmission and reception of the radio information in the second wireless communication based on signal strength received from the second wireless communication unit and a predetermined threshold.

3. The radiographic imaging system according to claim 2,
wherein the predetermined processing is detection of the signal strength exceeding the predetermined threshold by the control apparatus, and
wherein the control apparatus causes the notification unit to provide the first notification in a case where the detection has been performed.

4. The radiographic imaging system according to claim 1,
wherein the predetermined processing is detection of establishment of the second wireless communication by the control apparatus, and
wherein the control apparatus causes the notification unit to provide the first notification in a case where the detection has been performed.

5. The radiographic imaging system according to claim 1,
wherein the radio information is an identifier for the radiographic imaging apparatus received from the radiographic imaging apparatus in the second wireless communication,
wherein the predetermined processing is detection of a match between the identifier for the radiographic imaging apparatus and an identifier pre-stored in the control apparatus by the control apparatus, and
wherein the control apparatus causes the notification unit to provide the first notification in a case where the detection has been performed.

6. The radiographic imaging system according to claim 1, wherein the radiographic imaging apparatus includes the notification unit.

7. The radiographic imaging system according to claim 1, wherein the control apparatus includes the notification unit.

8. The radiographic imaging system according to claim 1,
wherein the notification unit includes a luminous body, and
wherein the control apparatus causes the luminous body to emit light to provide the first notification or the second notification.

9. The radiographic imaging system according to claim 8, wherein the control apparatus causes the luminous body to emit a different pattern of light for each of the first notification and the second notification.

10. The radiographic imaging system according to claim 1,
wherein the notification unit includes a sound source, and
wherein the control apparatus causes the sound source to produce a sound to provide the first notification or the second notification.

11. The radiographic imaging system according to claim 10, wherein the control apparatus causes the sound source to produce a different pattern of sound for each of the first notification and the second notification.

12. The radiographic imaging system according to claim 1,
wherein the notification unit includes a display, and
wherein the control apparatus causes the display to display one or more of the first notification or the second notification.

13. A radiographic imaging system comprising:
a radiographic imaging apparatus configured to perform radiographic imaging based on radiation emitted from a radiation generation apparatus;
a control apparatus configured to perform wireless communication with the radiographic imaging apparatus to control the radiographic imaging; and
a notification unit configured to provide a notification to an operator,
wherein the radiographic imaging apparatus performs a first wireless communication with the control apparatus to transmit image data obtained by the radiographic imaging to the control apparatus and a second wireless communication with the control apparatus to transmit and receive radio information to be used for the first wireless communication, and
wherein the control apparatus causes the notification unit to provide a first notification based on predetermined processing executed by the control apparatus in a period after start of the second wireless communication and before completion of the transmission and reception of the radio information and causes the notification unit to provide a second notification based on the completion of the transmission and reception of the radio information in the second wireless communication.

14. A radiographic imaging apparatus configured to perform radiographic imaging based on radiation emitted from a radiation generation apparatus in a radiographic imaging system, the radiographic imaging system including a control apparatus configured to control the radiographic imaging, the control apparatus including an access point and a communication device each configured to perform wireless communication with the radiographic imaging apparatus, the radiographic imaging apparatus comprising:
a first wireless communication unit configured to perform a first wireless communication with the access point to transmit image data obtained by the radiographic imaging to the control apparatus;
a second wireless communication unit configured to perform a second wireless communication with the communication device to transmit and receive radio information to be used for the first wireless communication; and
a notification unit configured to provide a notification to an operator,
wherein the notification unit provides a first notification based on a notification from the control apparatus that the control apparatus has executed predetermined processing in a period after start of the second wireless communication and before completion of the transmission and reception of the radio information, and provides a second notification based on a notification from the control apparatus that the transmission and reception of the radio information has been completed in the second wireless communication.

15. A control apparatus configured to control radiographic imaging in a radiographic imaging system, the radiographic imaging system including a radiographic imaging apparatus configured to perform the radiographic imaging based on radiation emitted from a radiation generation apparatus and a notification unit configured to provide a notification to an operator, the control apparatus comprising:

an access point configured to perform wireless communication with the radiographic imaging apparatus; and
a communication device configured to perform wireless communication with the radiographic imaging apparatus,
wherein the control apparatus performs a first wireless communication between the access point and a first wireless communication unit included in the radiographic imaging apparatus to receive image data obtained by the radiographic imaging from the radiographic imaging apparatus and performs a second wireless communication between the communication device and a second wireless communication unit included in the radiographic imaging apparatus to transmit and receive radio information to be used for the first wireless communication, and
wherein the control apparatus causes the notification unit to provide a first notification based on predetermined processing executed by the control apparatus in a period after start of the second wireless communication and before completion of the transmission and reception of the radio information and causes the notification unit to provide a second notification based on the completion of the transmission and reception of the radio information in the second wireless communication.

16. A method for a radiographic imaging system including a radiographic imaging apparatus configured to perform radiographic imaging based on radiation emitted from a radiation generation apparatus, a control apparatus configured to control the radiographic imaging, the control apparatus including an access point and a communication device each configured to perform wireless communication with the radiographic imaging apparatus, and a notification unit configured to provide a notification to an operator, the method comprising:
performing a first wireless communication; and
performing a second wireless communication,
wherein the second wireless communication is performed between the communication device and a second wireless communication unit included in the radiographic imaging apparatus to transmit and receive radio information,
wherein the first wireless communication is performed between the access point and a first wireless communication unit included in the radiographic imaging apparatus to transmit image data obtained by the radiographic imaging to the control apparatus using the radio information received in the second wireless communication, and
wherein, in the second wireless communication, the control apparatus performs at one or more of causing the notification unit to provide a first notification based on predetermined processing executed by the control apparatus in a period after start of the second wireless communication and before completion of the transmission and reception of the radio information or causing the notification unit to provide a second notification based on the completion of the transmission and reception of the radio information in the second wireless communication.

17. A non-transitory computer-readable storage medium storing a program for causing a computer to execute the method according to claim 16.

* * * * *